UNITED STATES PATENT OFFICE.

GUSTAVUS MICHAELIS, OF ALBANY, NEW YORK, ASSIGNOR OF ONE-HALF TO WILLIAM T. MAYER, OF SAME PLACE.

MANUFACTURE OF CHLOROFORM AND OF PURIFIED ACETATES.

SPECIFICATION forming part of Letters Patent No. 322,194, dated July 14, 1885.

Application filed November 18, 1884. (No model.)

*To all whom it may concern:*

Be it known that I, GUSTAVUS MICHAELIS, a citizen of the United States, residing at Albany, county of Albany, and State of New York, have invented certain new and useful Improvements in Manufacture of Chloroform and Acetic Acid or Purified Acetates, fully described in the following specification.

The object of this invention is the treatment of residual crude acetates arising from the proper chemical treatment of the products which are received from the decomposition of wood at high temperatures, to obtain products from which chloroform can be produced, and a residual matter, from which latter acetic acid or purified acetates may be obtained.

This invention is based upon the discovery that when a crude acetate, as of lime, is subjected to dry distillation only very small quantities of acetone, ($CH_3COCH_3$,) boiling at 56° centigrade, are formed, while very considerable quantities of dimethylacetal, $C_2H_4(OCH_3)2$, boiling between 60° and 65° centigrade, ethylmethylacetal, $C_2H_4(OC_2H_5)OCH_3$, boiling at 85° centigrade, methyldimethylketone, ($CH_3COCH_2CH_3$,) boiling between 75° and 77° centigrade, methylethylketone, ($CH_3COC_2H_5$,) boiling between 75° and 80° centigrade, diethylketone, ($C_2H_5COC_2H_5$,) boiling between 75° and 85° centigrade, metacetone ($C_6H_{10}O$,) boiling between 82° and 86° centigrade, and other still higher boiling ketones, as dumasin and other liquids, together with a large quantity of an apparently oily substance, which also holds some of the before stated ketones, &c., in solution, are the result of the process.

This invention is based upon the further discovery that while pure acetone yields when distilled with a hypochlorite only thirty-three per cent. of chloroform the above enumerated ketones and other liquids, all of which possess higher boiling-points than does acetone, will yield, when freed from water and treated with a hypochlorite, chloroform in the large and unprecedented quantity of measure for measure. This yield is due to the fact that while a purified acetate, say of lime, yields larger quantities of acetone, and only (comparatively speaking) small quantities of foreign bodies, the crude article, say of lime, which contains also formiate of lime, proponiate of lime, butyrate of lime, and very often salts of a still higher composition, together with other foreign bodies, tarry substances, &c., which are the result of the dry distillation of wood, gives, when subjected to the process of dry distillation, as borne out by actual experiment, just the opposite result—viz., small quantities of acetone and large quantities of foreign bodies varying in boiling-point between 60° and 180° centigrade, respectively.

One branch of the invention consists in the production of chloroform by first obtaining the liquids (rich in chloroform-yielding agents) that result from the decomposition of a crude acetate at high temperatures, mixing said liquids with a hypochlorite and then distilling the same. In separating these liquids from the crude acetates by distillation at high temperature in a suitable vessel I also obtain a residue consisting of carbonate of lime, acetate of lime, carbon, and slight tarry impurities, in a most favorable condition for conversion into acetic acid or purified actates.

Another branch of the invention, therefore, consists in the process of treating crude acetates for the production of chloroform by distilling the same at a high temperature, whereby are obtained not only the rich chloroform-producing agents, but also a residue in suitable condition for conversion into acetic acid or purified acetates.

In practically carrying the invention into effect I place a quantity, about one hundred pounds, say, of crude acetate of lime in a suitable vessel and subject the same to dry distillation at a high temperature, maintained at about 300° to 500° Celsius until volatile products are no longer condensed. The result of this is about thirty-two pounds of a liquid consisting of a stratum of an aqueous liquid, upon which floats a stratum of an oily liquid, the proportion being about as four of the former is to one of the latter. The aqueous liquid which is rich in chloroform-yielding agents, before referred to, is then removed as ready for use. The oily liquid, which also contains large quantities of the before-referred-to chloroform-yielding agents, is then subjected for their recovery either to fractional distillation or it may be by washing with tepid water, and the resulting aqueous liquid is added to that previously removed. These combined aqueous liquids will posses a specific gravity of 0.965 to 0.975.

In thus distilling the crude acetate the greater part of the chloroform-producing agents contained in the crude acetate are obtained, and in addition thereto a residue is left in a favorable condition for ready conversion into acetic acid or purified acetates. In this distilling operation care should be taken not to carry the temperature so high as to destroy the chloroform-yielding agents.

Now, in order to obtain crude chloroform from the above-mentioned aqueous liquid, I proceed to bring it into reaction in the following manner, viz: I take of the above-described aqueous liquid, rich in chloroform-producing agents, a quantity, say nine pounds, and mix it with about forty pounds of chloride of lime or any other suitable hypochlorite and about fifteen gallons of water, and subject the whole to distillation in the usual manner for the production of crude chloroform. The crude chloroform so produced will be found to possess a specific gravity varying from 1.465 to 1.485, and may be rectified in the usual manner.

From thirty-two pounds of liquid made by this process from one hundred pounds of crude acetate, and which contains some acetone, I obtain of chloroform a yield of about measure for measure, when we consider said liquid, deprived of its water, as a basis of comparison. I have also demonstrated that by separating out of said liquid the small portion of acetone it contains, I still obtain from such liquid the large yield of about measure for measure, and hence this may be done without departing from the essence of this invention.

In this improved process it will be observed that the distillation of the acetate is carried on at a temperature at least as high as that at which the before mentioned liquids are formed, and that they are recovered in an aqueous liquid and in an oily liquid, and that as each of these liquids is rich in said chloroform-producing agents, and it is due to the utilization of said agents that the proportionate large yield of chloroform is produced, it is to be understood that this process includes the production of chloroform from either the oily liquid or the aqueous liquid, or both, which result from the distillation of the crude acetate at the high degree stated or such temperature as will recover these agents.

From this process also results the partial purification of the crude acetate by the elimination therefrom of the rich chloroform-producing agents, and the residue left in the vessel, which consists of carbonate of lime, undecomposed acetate of lime, carbon, and slight tarry impurities, is treated for the recovery of acetic acid or purified acetates by leeching with water. The aqueous solution thus obtained is composed of water, acetate of lime, and slight impurities, and will be treated by the ordinary known process for obtaining these products—namely, either acetic acid or purified acetates. By preference I use the article of commerce known as "crude brown acetate of lime;" but any other crude acetate may be used with like beneficial results.

The yield of crude chloroform from the above described quantity of liquid—namely, nine pounds—ranges between four and one-half and five pounds. The yield of acetic acid or purified acetates will vary according to the degree of temperature used in the distilling operation and according to the quality of the crude acetate employed, and its yield will range from between twenty to twenty-five per cent. of the original quantity of acetic acid contained in the crude acetate employed. Thus are produced from a cheap base valuable and comparatively large quantities of both chloroform and acetic acid or purified acetates at a very low cost.

Having thus described my invention, what I claim is—

1. The process of producing chloroform and valuable residual products, consisting in subjecting crude acetates to dry distillation at high temperatures to remove the fluid products therefrom, then subjecting such fluid products to the action of a hypochlorite, condensing the chloroform obtained therefrom, and purifying the residual products of the dry distillation, substantially as described.

2. The production of chloroform from the liquid products resulting from the decomposition of crude acetates at high temperatures by subjecting said liquid products to the action of a hypochlorite and removing the chloroform therefrom by distillation, substantially as described.

3. The process of treating crude acetates, said process consisting in separating out the chloroform-yielding agents by distilling the crude acetate at a high temperature and leaving a residue suitable for conversion into acetic acid or purified acetates, substantially as de-described.

In testimony whereof I have hereunto set my hand in the presence of two subscribing witnesses.

GUSTAVUS MICHAELIS.

Witnesses:
 H. T. MUNSON,
 T. H. PALMER.